United States Patent
Rickard

[15] 3,687,438
[45] Aug. 29, 1972

[54] MOTORCYCLE SUSPENSION APPARATUS

[72] Inventor: Donn J. Rickard, 1726 Bender Ave., Glendora, Calif. 91740

[22] Filed: Sept. 11, 1970

[21] Appl. No.: 71,301

[52] U.S. Cl. ................................... 267/64, 267/34
[51] Int. Cl. ................................................ F16f 5/00
[58] Field of Search ........................... 267/64, 34, 8

[56] References Cited

UNITED STATES PATENTS 3,447,797  6/1969  Roberts ....................... 267/64
2,259,589  10/1941  Ehleicher ................... 267/34

*Primary Examiner*—James B. Marbert
*Attorney*—George J. Netter and Kendrick, Subkow and Kriegel

[57] ABSTRACT

Each wheel suspension member includes a pair of telescoping tubes, one connected to the cycle frame and the other connected to the wheel axle. As the wheel receives a perturbation, the tubes are telescoped further within one another which forces an enclosed hydraulic fluid through restricting orifice means to damp the effect received at the upper cycle frame. Simultaneously, an enclosed coil spring is compressed by the same action, which also serves to dampen shock and vibration effect. Conduiting for the hydraulic fluid isolates the fluid from a substantial length of the coil spring, thereby obviating fluid entrapment by the spring. On resuming rest condition the coil spring returns the telescoped tubes to their original relationship, at which time the hydraulic fluid returns through the orifice means, again without contacting the major spring length.

3 Claims, 4 Drawing Figures

Patented Aug. 29, 1972
3,687,438
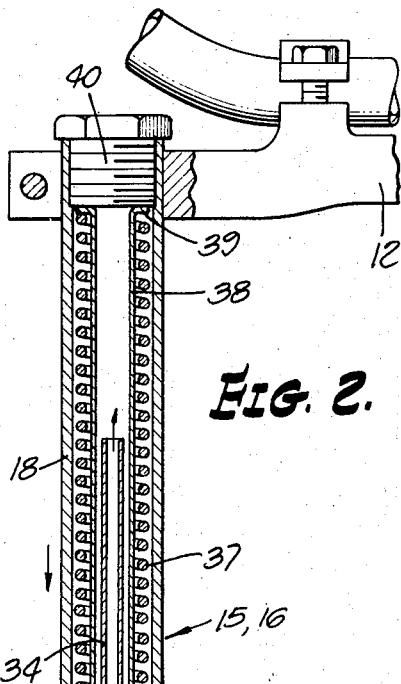
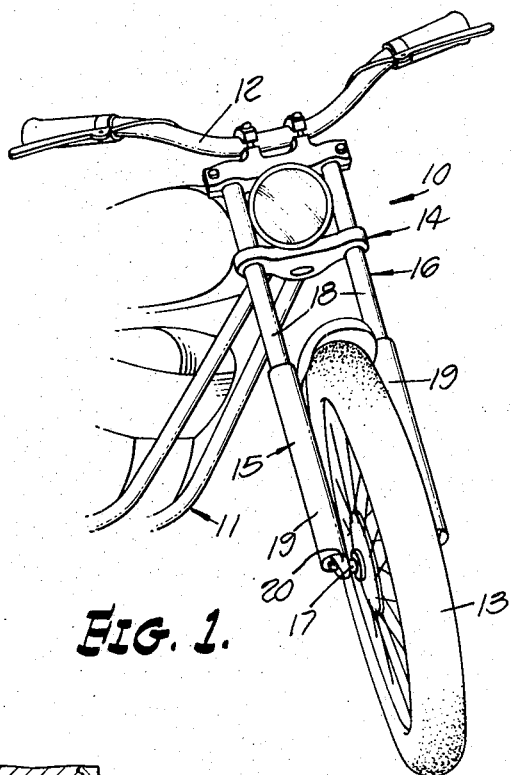
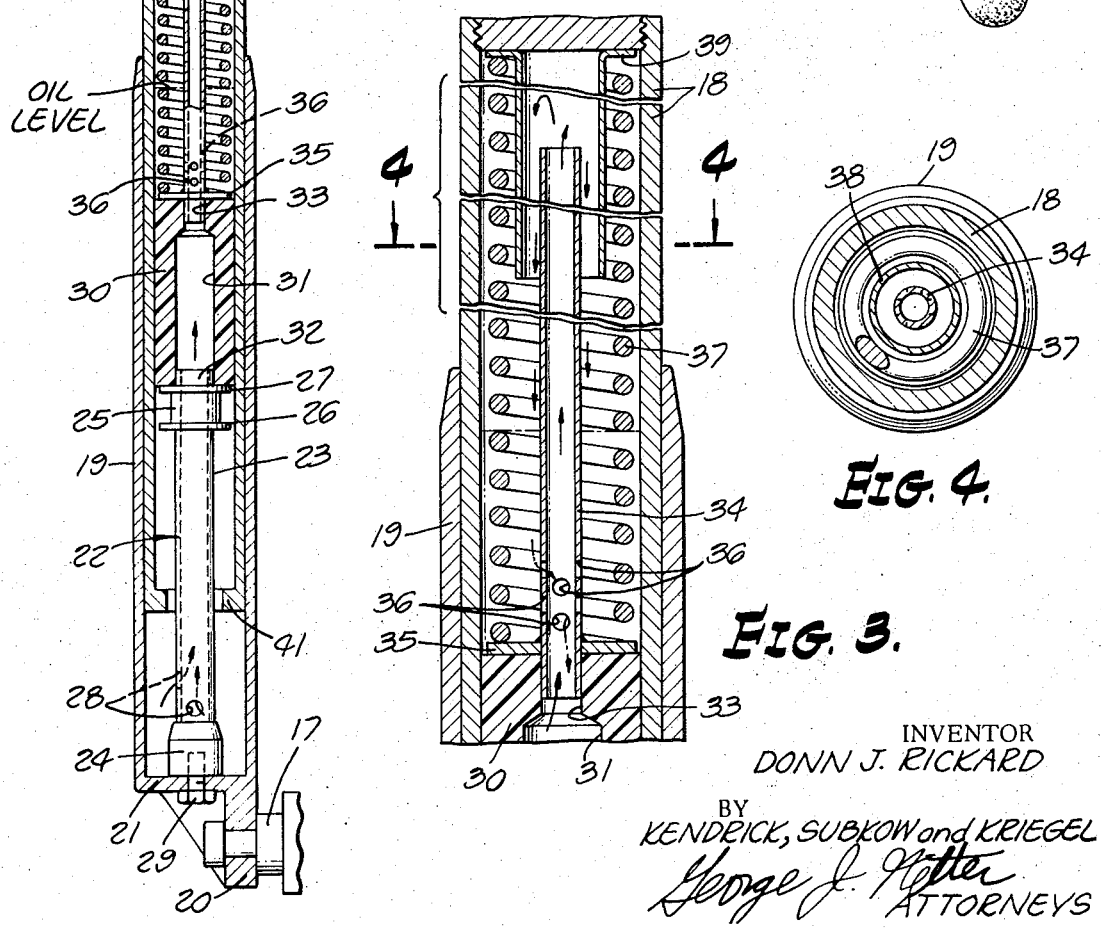
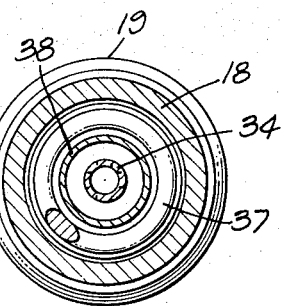
INVENTOR
DONN J. RICKARD
BY
KENDRICK, SUBKOW and KRIEGEL
George J. Netter
ATTORNEYS

MOTORCYCLE SUSPENSION APPARATUS

The present invention relates generally to motorcycles, and, more particularly, to wheel suspension apparatus for a motorcycle providing improved shock and vibration absorption characteristics.

BACKGROUND OF THE INVENTION

It has been conventional in the past to provide the front wheel of a two-wheeled motorcycle with a suspension system for absorbing or damping shocks and vibrations to provide the rider with a more comfortable and safer ride. The need for such shock and vibration absorption has been considerably increased in recent years, particularly with the advent of "off-the-road" or "dirt" bike riding for general recreation and racing, in which the vehicle traverses terrain that is highly uneven and bumpy as compared to a typical road surface. It is apparent that in driving a motorcycle under off-road conditions, unless efficient and continuously operating shock and absorption means are provided, not only will the riding qualities be less than desirable, but such riding can be dangerous to the driver in that a sudden shock may throw the motorcycle out of control.

One conventional approach in the past has been to mount the front wheel to the cycle frame by coil springs, which, through their inherent resiliency, absorb a certain amount of the vibrations and shocks produced during riding. Such springs are useful for this purpose, however, they are only effective for a limited range of shock and vibration dependent upon the physical parameters of any given spring. For example, if a set of springs are made sufficiently resistive in order to be able to accommodate relatively high shock loads, they will present little resiliency to lower level shocks and vibrations.

Another approach has been to utilize a hydraulic device operating somewhat similarly to a conventional dashpot, in which the front wheel of the cycle is interrelated to the cycle frame through the intermediary of a hydraulic fluid for damping. Again, this approach alone is not completely satisfactory in that the resistance to shock of such a device is proportional to the speed with which it is applied, such that very hard and quick shocks are resisted with a high amount of force, i.e., do not provide resilient damping.

Accordingly, to obtain a broader range of accommodation of shocks and vibrations, the more recent approach has been to combine the action of a hydraulic device and a coil spring in the same suspension apparatus. The most widely accepted version of such combination apparatus encloses the coil spring and the hydraulic device within the same housing, so that all that is seen from the exterior is two sets of telescoping tubes interconnecting the bike frame and front wheel, one at each side of the wheel. A consistent problem encountered in the use of known combination spring-hydraulic systems is that on initiating operation of a cycle over rough or uneven terrain, a relatively high performance level is attained, after which performance rapidly degrades. More particularly, it has been found that in this kind of suspension means, the hydraulic device, upon applying continuing series of shocks to the cycle front wheel suffers a loss in damping efficiency. Although other factors may influence operational efficiency, it is believed that the hydraulic fluid used, shortly after initiation of operation, becomes entrapped within the coil spring loops and therefore is not available for use in the hydraulic device. Of course, if the cycle is allowed to rest, the hydraulic fluid will drain off the spring and again be available for use by the hydraulic device, which accounts for the cyclic high-efficiency, low efficiency operation experienced with such systems.

OBJECTS AND SUMMARY OF THE INVENTION

It is, therefore, a primary aim and object of this invention to provide motorcycle shock absorption apparatus of improved continuous performance operation.

Another object of the invention is the provision of motorcycle wheel suspension apparatus including spring and hydraulic shock absorption means of substantially constant efficiency during extended use.

Yet another object of the invention is the provision of a combination spring-hydraulic suspension apparatus as in the above objects in which the hydraulic fluid is maintained isolated from the spring during operation.

In accordance with the practice of the present invention, a motorcycle fork for interrelating the front wheel of the cycle and the frame includes a pair of suspension members, one at each side of the wheel, and each one of which includes a pair of telescoping tubes, one connected to the frame and the other connected to the front wheel axle. As the wheel receives a shock or vibration, the tubes are caused to be telescoped further within one another which forces an enclosed hydraulic fluid through a restricting orifice means to dampen the effect on the upper frame of the cycle. Simultaneously, an enclosed coil spring is compressed by the same action, which also serves to dampen shock and vibration effect. Conduiting for the hydraulic fluid isolates the fluid from a substantial length of the coil spring, thereby obviating fluid entrapment by the spring. On the cycle resuming rest condition, the coil spring returns the telescoped tubes to their original relationship, at which time the hydraulic fluid returns through the orifice means, again without contacting the major length of the spring.

DESCRIPTION OF THE DRAWINGS

FIG. 1 is a front elevation view of a motorcycle, showing the shock absorption suspension of the present invention.

FIG. 2 is a sectional, elevational view of the wheel suspension of the present invention.

FIG. 3 is an enlarged sectional partially fragmentary view of the suspension of FIG. 2.

FIG. 4 is a transverse sectional view taken along line 4—4 of FIG. 3.

DESCRIPTION OF A PREFERRED EMBODIMENT

FIG. 1 depicts a generally frontal view of a motorcycle 10 having a body frame 11, handlebars 12, front wheel 13 and a fork 14 interrelating the wheel, frame and handlebars. More specifically, the fork 14 includes a pair of suspension members 15 and 16 which are rotatably journaled at their lower ends with the front wheel axis 17 providing a resilient suspension for the front wheel in a way that will be described.

Turning now to FIG. 2, each suspension member 15, 16 is seen to include an open-ended, hollow cylinder or tube 18, frequently referred to as a stanchion, which has its lower end telescopingly received within the open end of a second hollow tube or cylinder 19, sometimes referred to as a slider. The relative dimensions of the tubes 18 and 19 are such as to provide a close, sliding fit when they are telescoped together, that is, sufficiently loose to prevent binding or galling, and yet not spaced enough to permit cocking.

The lower closed end of the slider tube 19 includes a flange 20 extending outwardly in the long direction of the tube and via which interconnection is made to the front wheel axis in a conventional manner.

Affixed to the inner end wall 21 of the slider 19 for extending upwardly coincident with the tube axis is a damper tube means 22 comprising hollow tube member 23 terminating at its lower end in a mounting boss 24, and a collar 25 with a pair of circular flanges 26 and 27 thereon spaced from the other end of the member 23. Several openings 28 are provided in the tube adjacent the boss 24. The damper tube means 22 is integrally secured to the end wall 21 by a threaded means 29.

An extension cylinder 30 of outer diameter permitting free sliding receipt within the stanchion 18 has an axially located longitudinal bore 31 extending throughout its complete length. The bore lower end is received onto the upper terminus 32 of the tube member 23 with the lower end wall of the extension cylinder contactingly engaging flange 27.

The upper end opening of the extension cylinder bore 31 is of reduced diameter as at 33 and into which is fitted one end of an elongated cylindrical conduit 34. A circular flange 35 is secured to the conduit at a point spaced slightly from its lower end and rests on the upper surface of the extension cylinder 30 when the conduit end is received within 33. A plurality of openings 36 are formed in the conduit side wall in the region immediately adjacent flange 35.

An elongated compression coil spring 37 is received within the stanchion 18 with its lower end bearing against flange 35. An open-ended isolation tube 38 of outer diameter slightly less than the inner diameter of spring 37 is received within the spring from its upper end and is supported therein by end flange 39. The lower end of isolation tube 38 extends substantially below and in space surrounding relationship to the upper end of conduit 34 throughout operation for a purpose that will be clarified below. The upper end of stanchion 18 is closed by a threaded plug 40, while its lower open end includes wall portions 41 for engaging flange 26 of collar 25 to limit stanchion upward movement.

Initially, with the motorcycle at rest, hydraulic fluid (oil) is at the approximate level shown in FIG. 2, i.e., below the upper end of slider 19, but above the openings 36. Accordingly, the entire lower reaches of the slider tube 19, the bore 31 of the extension cylinder and the interior of tube member 23 are filled with the hydraulic fluid. As shocks and vibrations are applied to the front wheel, the slider moves upwardly on the stanchion compressing the hydraulic fluid in the lower reaches of the slider, causing it to move through openings 28, upwardly through tube member 23, the core 31, conduit 34, and, if the shock or vibration is of sufficient strength, the fluid will spill out the end of 34 to drain downwardly along the conduit 34 or along the inner wall of the isolation tube 38. Also, at this same time the upward movement of the slider relative to the stanchion compresses the spring 37. On reassumption of the rest condition, the spring distends and the hydraulic fluid moves downwardly through 34, either directly along its main bore or via openings 36, to exit at openings 28 filling the lower reaches of 19. In any event, the hydraulic fluid which is emitted from 34 during the pressure stroke of the suspension member does not become entrapped by the spring loops, but moves along an isolated path for reentry into the lower end of the chamber of the slider 19.

There is provided in accordance with the practice of this invention an improved suspension apparatus which effects damping of shocks and vibrations at a substantially continuous high level of efficiency. Moreover, the described suspension obtains the combined benefit of hydraulic damping and coil spring damping without the lowered efficiency in hydraulic action experienced in known prior apparatus of the same general kind.

What is claimed is:

1. Suspension apparatus, in combination, comprising:

first hollow tube means having a closed end and an open end;

second hollow tube means having a closed end and an open end, with its open end telescopingly related to the open end of the first tube means, said tubes being generally vertically arranged with the closed end of the second tube means disposed at the lower end;

hydraulic damper means having upper and lower ends secured to the inner closed end of said second hollow tube means and extending upwardly within both said first and second hollow tube means, said damper means including, means unitary therewith and spaced from the damper means upper and lower ends for sliding contact with the internal wall surface of said first tube means, and wall means defining a continuous bore with a first outer opening adjacent the upper end, a second outer opening adjacent the lower end, and a third outer opening above the unitary means spaced downwardly from said first opening;

a compression coil spring received within said first tube means having one end secured against movement within said first tube means and its other end engaging the means unitary with the damper means;

third hollow tube means received within the spring and extending from its upper end for an extent sufficient to enclose a major portion of the upper end of the damper means including the first opening; and a supply of hydraulic fluid received within the second tube means such that applied perturbations to said tube means are damped by the combined action of the spring and hydraulic fluid and on cessation of the perturbations the hydraulic fluid enters the second and third openings, moves along the damper means bore and exits through the first opening into the lower end of the second tube means.

2. Suspension apparatus as in claim 1, in which the damper means includes a hollow tubular member that extends upwardly within the first tube means and spring, the upper open end of which comprises said first bore opening; and said third tube means being received about the upper end portions of the hollow tubular member.

3. Suspension apparatus as in claim 2, in which the means unitary with the damper means includes an extension cylinder of outer diameter providing a close fit within the first tube means; the hollow tubular member having its lower end mounted to the extension cylinder.

* * * * *